United States Patent [19]

Jensen

[11] Patent Number: 4,474,514
[45] Date of Patent: Oct. 2, 1984

[54] MULTI-PURPOSE DRILLING JIG

[76] Inventor: Frank A. Jensen, 1098 S. Blvd., Idaho Falls, Id. 83401

[21] Appl. No.: 358,710

[22] Filed: Mar. 16, 1982

[51] Int. Cl.³ .............................................. B23B 49/02
[52] U.S. Cl. ................................ 408/115 R; 83/821; 408/72 B; 408/72 R; 408/97; 408/115 B
[58] Field of Search .............. 408/72 R, 72 B, 115 R, 408/115 B, 104–106, 97; 279/86, 87, 89, 90; 30/392; 83/635, 821, 822, 827, 828

[56] References Cited

U.S. PATENT DOCUMENTS

| | | | |
|---|---|---|---|
| 2,029,650 | 2/1936 | Betz | 408/115 |
| 2,058,298 | 10/1936 | Chesley | 408/72 R |
| 2,367,582 | 1/1945 | Honyoust | 408/76 |
| 2,416,010 | 2/1947 | Klosz | 408/115 |
| 2,602,238 | 7/1952 | Wellman | 408/115 X |
| 2,884,820 | 5/1959 | Pearce | 408/72 |
| 2,915,926 | 12/1959 | Woerner | 408/115 R |
| 2,987,944 | 6/1961 | Ammann | 408/72 R |
| 3,521,511 | 7/1970 | Deuring et al. | 279/1 ME |
| 3,811,788 | 5/1974 | Mollon | 408/72 R |
| 4,145,160 | 3/1979 | Wiggins | 408/103 |
| 4,153,384 | 5/1979 | Isaken | 408/115 R |
| 4,294,567 | 10/1981 | Wiggins | 408/72 R |
| 4,327,621 | 5/1982 | Voorhees et al. | 83/821 |

FOREIGN PATENT DOCUMENTS

| | | | |
|---|---|---|---|
| 91683 | 3/1923 | Fed. Rep. of Germany | 408/115 R |
| 2912605 | 10/1980 | Fed. Rep. of Germany | 408/115 R |

Primary Examiner—William R. Briggs
Assistant Examiner—Lawrence H. Meier
Attorney, Agent, or Firm—Bacon & Thomas

[57] ABSTRACT

A drilling jig is disclosed which not only permits the drilling of multiple holes on a flat surface or on the edges of a workpiece, but accessories are also disclosed which permit the drilling jig to be converted into a divider, a compass, inside and outside calibers, and a cutting guide for use with either a knife or a saber saw blade. The drilling jig consists of one or more elements having fixed drill guide bushings located along their lengths fastened together end to end. An element having a pair of drill guide bushings which are adjustable along the length of this element is also joined to the elements having fixed drill bushings so as to enable the jig to set any spacing along the length of the work. Adjustable guides are affixed to the sides of the drilling jig to enable its accurate placement on the edge of a workpiece. A device is also disclosed for fastening the elements together to enable their use as a rigid unit, while at the same time enabling them to be readily disconnected and stored.

17 Claims, 19 Drawing Figures

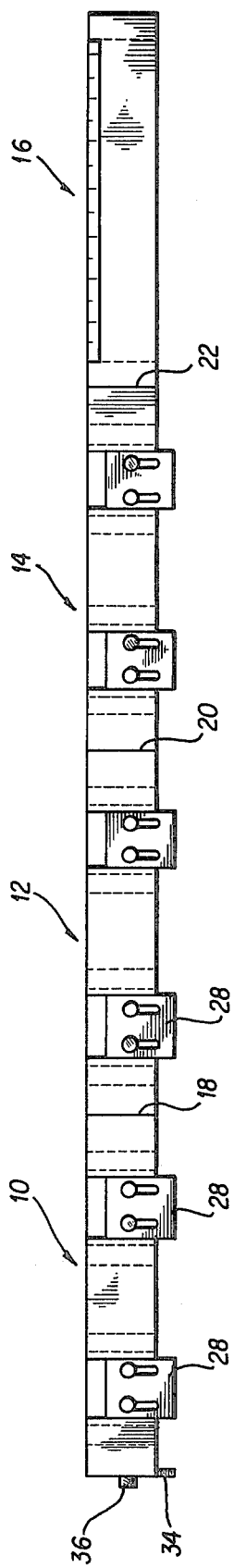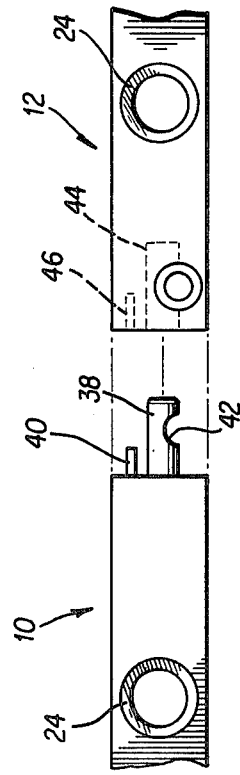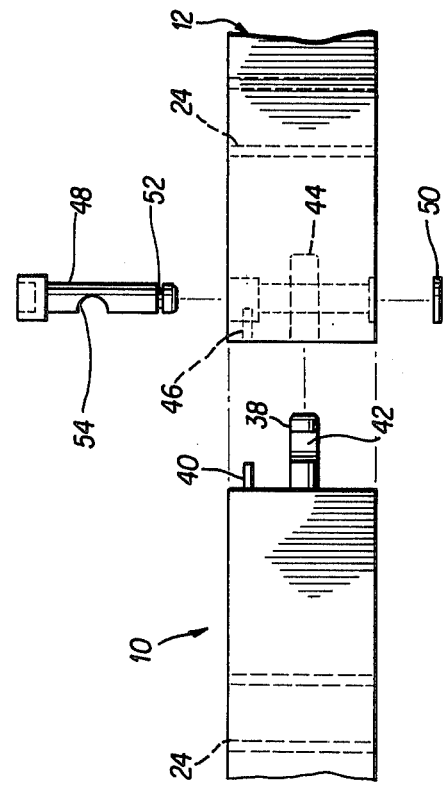

MULTI-PURPOSE DRILLING JIG

BACKGROUND OF THE INVENTION

This invention relates to drilling jigs, more particularly those having other accessories to give the drilling jig a multiplicity of functions.

BRIEF DESCRIPTION OF THE PRIOR ART

It is often necessary for an artisan to drill a series of holes across the surface, or across an edge of a workpiece such that the holes are evenly and accurately spaced apart a predetermined distance. Over the years many devices have been developed to enable him to carry out this task. The most rudimentary of these is the fixed hole drilling jig, which comprises merely a straight length of material with a series of holes along its length. These holes may be accurately spaced in the workshop storing fabrication and, once on the job, the artisan need merely to place the jig against the workpiece and drill through the holes in the drilling jig. However, the use of this basic drilling jig presents obvious problems insofar as there is no way to adjust the spacing between the holes, and, if the length of the workpiece is substantial, the drilling jig itself must be repositioned along its length thereby introducing inaccuracies into its use.

In an attempt to overcome the adjustability problems of the fixed drill guide jig, the adjustable drill guide jig was invented. Basically, this comprised an elongated support element having generally two adjustable guide bushings slidably attached to it. These bushings were adjustable along the length of the jig to enable the drilling of holes having any spacing therebetween. However, this device presented obvious limitations when more than two holes had to be drilled, since the artisan was forced to either reposition the entire jig, or to readjust the individual drill guides each time. It also became known to attach two of the adjustable jigs together to enable more than two holes to be drilled. However, due to the necessity of providing an open space to allow the individual drill bushings to slide along each of the elements, the combination of two or more of these becomes too flexible to ensure accurate placement when used over a substantial length.

These prior art devices have also suffered from the inability to be used to perform other functions. Oftentimes it is necessary for the artisan to lay out and cut large radius curves on the job site and, it would be quite advantageous to him if a drilling jig could be used to perform these tasks and eliminate the necessity of carrying around separate tools for each function.

SUMMARY OF THE INVENTION

The instant invention is directed toward a drilling jig which not only permits the drilling of equally spaced multiple holes on a flat surface or along an edge, but one that is capable of functioning as a divider, compass, calipers, or a saw guide. The multi-purpose drilling jig comprises several elements which fit together end-to-end to permit the drilling of many equally spaced holes along the workpiece without constantly repositioning the drill guides. In the preferred embodiment, the drilling jig comprises four elements attached together, with three of the elements having fixed, equidistantly spaced drill bushing holes extending along their length and a fourth element having adjustable drill guide bushings. Each of the three fixed drill guide elements have extendible slides on either side, which slides act as guides to accurately position the jig with respect to the workpiece. The endmost portion of the end element may also be equipped with a movable slide which permits the accurate alignment of the drilling jig with the end of the workpiece. The side guides are adjustably mounted to permit their use with the workpieces having a variety of widths.

The fourth element of the drilling jig has a pair of drill guide bushings that are slidably mounted such that the spacing between them may be adjusted. A scale or other indicia may be provided on the exterior surface of this element to enable the user to accurately position the drill guide bushings.

The invention also relates to means for attaching the elements together which enables the drilling jig to be handled as a rigid unit, while at the same time may be readily disconnected when desired. Each of the four elements has a pair of dowel-like protrusions extending from one end which engage corresponding holes in the end of the adjacent element. A locking element is disposed in this adjacent end with its axis at right angles to the axis of the hole. The locking element has a semi-circular notch in one side which, when it is aligned with the hole, allows one of the protrusions to pass into the hole until another semi-circular notch is aligned with the locking element. When the locking element is rotated, it engages this notch and will not allow the elements to be pulled apart.

The drilling jig may be adapted to other uses by incorporation of various accessories into the drillguide bushings. The jig may be used as a divider or trammel point tool by placing divider point adapters into two of the bushings. The distance between the divider points may be readily and easily adjustable by placing one of them in an adjustable drill guide bushing. Similarly, a centering pin may be placed in one of the bushings to enable the drilling jig to be used as a compass to either draw, or cut circles or curves in a large workpiece. A saber saw guide is inserted into one of the drill guide bushings to provide for accurate positioning of the saber saw blade when cutting such circles or curves. In order to cut arcs in semi-flexible material, a knife blade may be substituted for the saber saw guide and used either in conjunction with a divider point or a centering pin. Additionally, inside/outside caliper pin attachments may also be inserted into the drill guide bushings to enable the drilling jig to accurately measure the diameter of large objects.

BRIEF DESCRIPTION OF THE DRAWINGS

FIG. 1 is a side view of the multi-purpose drilling jig according to the invention;

FIG. 3 is a partial top view of the drilling jig according to the invention showing the interfitting of the elements;

FIG. 4 is a partial side view of the elements shown in FIG. 3;

DETAILED DESCRIPTION OF THE PREFERRED EMBODIMENTS

Figure 2:
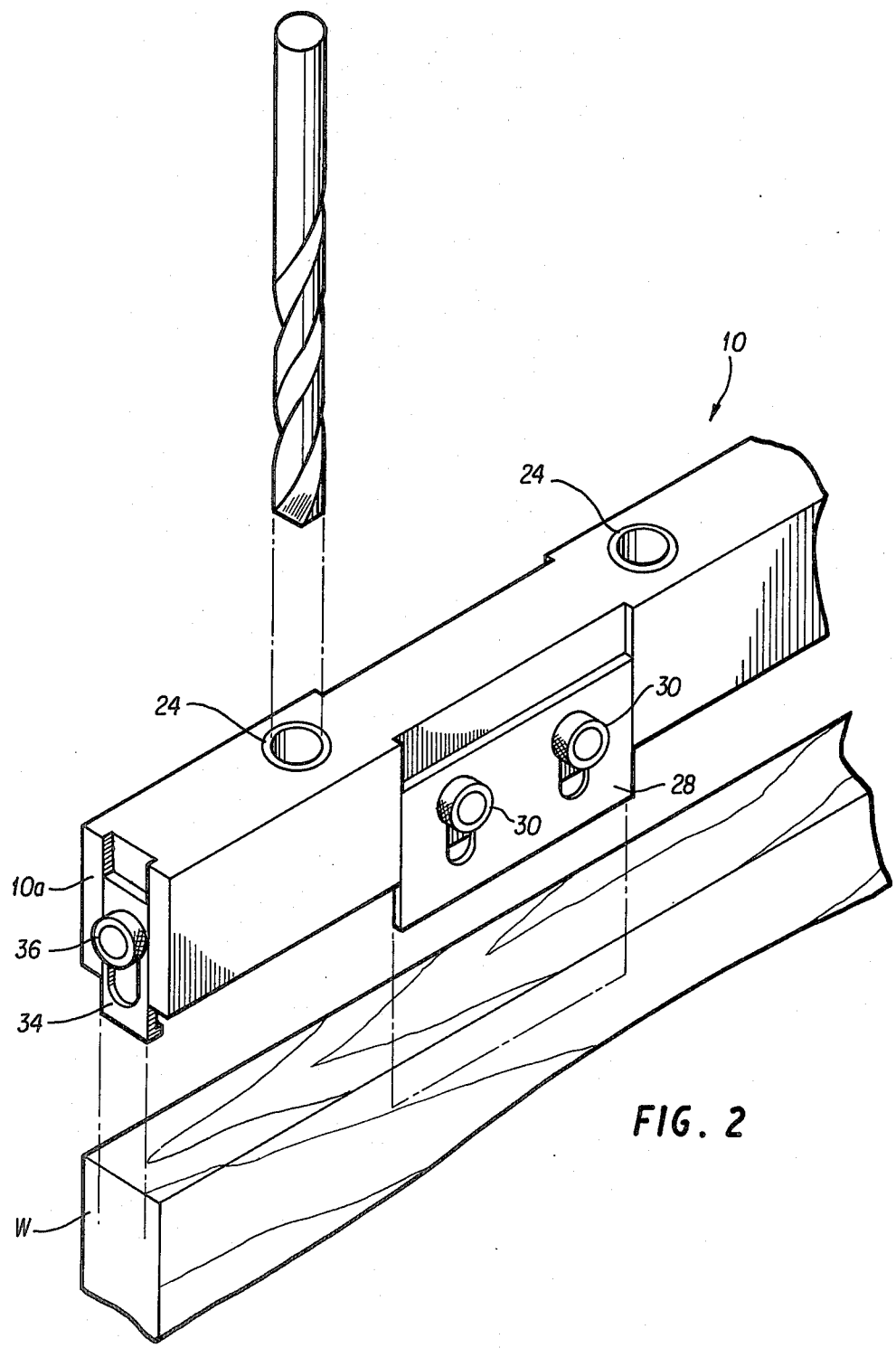
FIG. 2 is a partial perspective view of one end of the drilling jig shown in FIG. 1.
Figure 5:
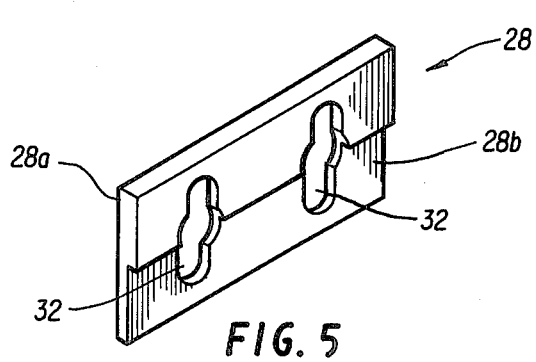
FIG. 5 is a perspective view of one of the lateral guide elements according to the invention.

The drilling jig according to the invention is shown best in FIGS. 1 and 2 and comprises individual elements 10, 12, 14, and 16 joined at their ends along lines 18, 20 and 22, respectively. These elements are joined together by a mechanism which will be described in more detail hereinafter. Although the invention will be described in terms of these four elements being joined together, the precise number of these elements is not a critical factor in this invention, and either a greater or lesser number may be used without exceeding the scope of this invention.

Each of the elements 10, 12 and 14 has a plurality of drill guide bushings extending through them along a generally vertical axis. The axes are equidistantly spaced along the length of the drilling jig. The drill guide bushings, shown as elements 24 in FIG. 2, have a hollow cylindrical shape and may be press-fit into suitably sized holes extending through the drilling jig elements. The bushings 24 should be formed of hard material or have their inner surfaces hardened since they serve as guiding elements for drilling tool 26.

Figure 6:
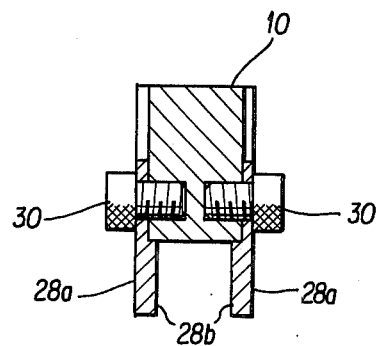
FIGS. 6, 7 and 8 are transverse cross-sectional views of the drilling jig according to the invention showing various positions of the lateral guides of FIG. 5.
Figure 7:
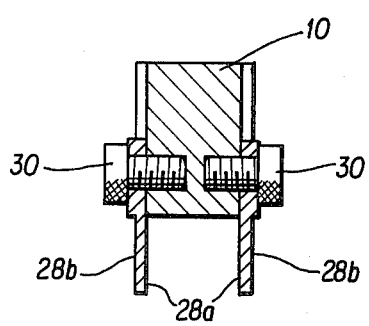
Figure 8:
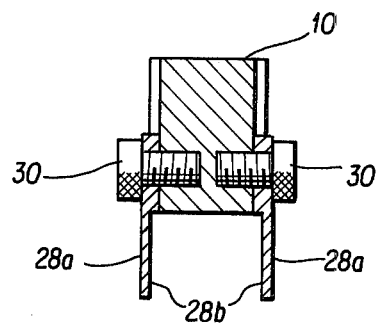

Additionally, each of the elements 10, 12 and 14 has a pair of lateral guide plates 28 slidably disposed on each side. The guide plates 28 may be vertically adjusted by adjusting screws 30 which extend through slots 32 and into the drilling jig elements. As shown in FIGS. 5-8, guide plates 28 have a planar side 28a and an opposing, stepped side 28b. The combination of these sides enable the width between corresponding pairs of guide plates to be adjusted to accommodate a variety of different-sized workpieces therebetween. FIG. 6 shows the configuration wherein both guide plates 28 are disposed with their notched sides 28B facing inwardly to give the narrowest dimension A between their inner faces. If guide plates 28 are reversed such that their planar surfaces 28a face inwardly, as shown in FIG. 7, this gives dimension B between their inner faces such that dimension B is larger than the aforementioned dimension A. Finally, as shown in FIG. 8, if the notched side 28b is again turned inwardly such that their thinner wall portion extends below the drilling jig, a larger dimension C exists between their inner faces. This allows the drilling jig to be placed along the edge of workpiece W, as shown in FIG. 2, such that the lateral guide plates engage either side of workpiece W so as to accurately position the drilling jig.

In similar fashion, end guide plate 34 may be slidably attached to end 10a of element 10 by screw means 36. Screw 36 is threadably engaged within 10a of element 10 and may be loosened to adjust the height of end guide 34. As is evident from FIG. 2, end guide 34 serves to accurately locate the end 10a of the drilling jig with respect to the end of workpiece W.

With the lateral and end guide plates extending below the bottom of the drilling jig, it may be utilized as a doweling fixture to accurately drill holes along a workpiece edge. However, the drilling jig is not limited to this function and may be capable of accurately drilling holes in a flat, planar workpiece merely by repositioning the guide plates 28 and 34 to a position flush with the bottom of the drilling jig.

FIGS. 3 and 4 show top and side views respectively of the mechanism utilized to rigidly attach the elements together. Although this will be described in terms of joining elements 10 and 12, it is understood that the remaining elements are attached together by similar mechanisms. Dowel-like locating pins 38 and 40 extend from one end of element 10 in a direction generally parallel to the longitudinal axis of the drilling jig. Locating pin 38 has a semi-circular notch 42 extending generally vertical through one side as shown. Adjacent element 12 has openings 44 and 46 dimensioned to slidably accept locating pins 38 and 40, respectively. The dimensions of the interfitting locating pins and holes should be such as to permit a sliding fit, but without excessive play in order to maintain the rigidity of the assembled drilling jig. The location of the pins and holes are such that the major exterior surfaces of elements 10 and 12 are coplanar when the elements are assembled.

Locking pin 48 extends downwardly through element 12 along a generally vertical axis and is retained in element 12 by engagement of snap ring 50 with notch 52 in locking pin 48. The dimensions between the snap ring and the head portion of locking pin 48 are such that locking pin 48 is capable of pivoting about its axis when located in element 12. Locking pin 48 also has a semi-circular notch 54 extending generally horizontally through one side portion, the diameter of notch 54 being slightly larger than the diameter of locating pin 38. As shown best in FIG. 3, the longitudinal axis of locking pin 48 is offset to one side of the axis of hole 44 and locating pin 38 such that the shaft of locking pin 48 extends downwardly through a portion of opening 44. In order to lock the elements together, once pin 48 is rotatably installed in element 12, it is rotated until notch 54 is aligned with opening 44 which allows the distal end of locating pin 38 to pass by locking pin 48. When the elements are seated in their final position, the axis of notch 42 coincides with that of locking pin 48. Thus, it can be seen that if locking pin 48 is then rotated, it will engage notch 42 and thereby prevent inadvertent separation of the elements.

Figure 10:
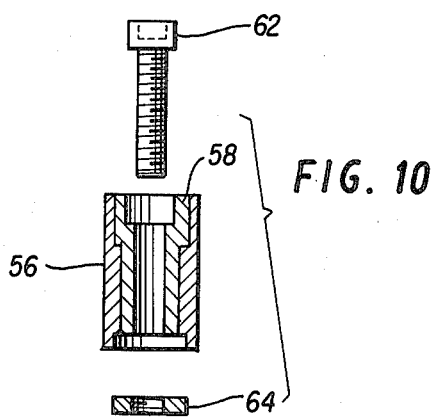
FIG. 10 is a transverse cross-sectional view taken along the lines A—A in FIG. 9.
Figure 9:
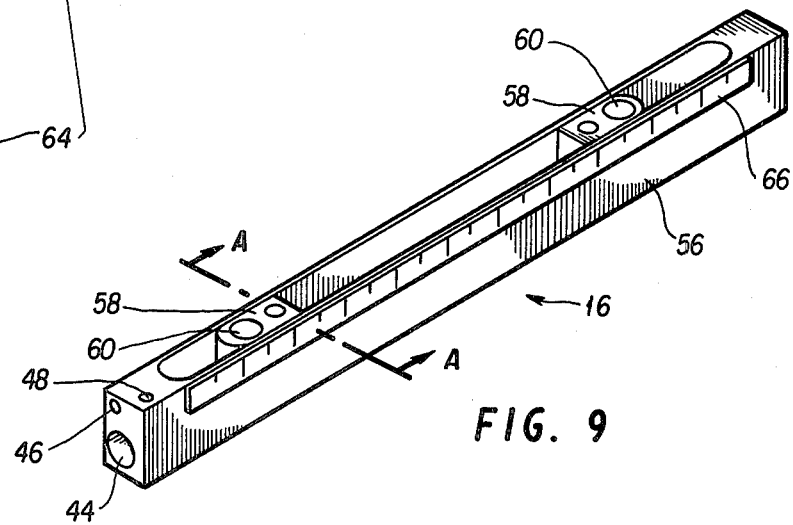
FIG. 9 is a perspective view of the adjustable drill bushing element according to the invention.

Element 16, as thus shown in FIGS. 9 and 10, comprises body portion 56 having a generally oval-shaped opening extending vertically through it in which rests adjustable drill guide bushings 58. Each of the adjustable guides 58 has a vertically extending opening 60 through which the drilling element may pass. Elements 58 are slidably retained in body 56 by screw 62 which extends downwardly through element 58 and engages nut 64. As can be seen in FIG. 10, the width of nut 64 exceeds the width of element 58 so that it engages the bottom portion of element 56. By tightening screw 62 and nut 64, the element 58 may be locked in position.

Element 16 has openings 44 and 46 located in one end as well as locking pin 48 such that it may be attached to an adjacent element by the locking mechanism previously described. Indicia 66 may be provided along one side of the body 56 to enable the user to accurately position drill guide bushings 58.

The use of the invention as a drilling jig should be readily apparent. The jig is positioned on the workpiece, using the lateral and end guides if holes are to be drilled in a workpiece edge, and the drill is inserted through the drill guide bushings 24. The device enables a plurality of holes to be drilled without the necessity of relocating the workpiece. This eliminates the inherent inaccuracies due to the constant relocation of the drilling guide. If holes having a spacing other than that existing in the fixed drill guide portion of the drilling jig, the adjustable drill guide element 16 may be used to re-position the remaining drilling jig elements.

Figure 11:
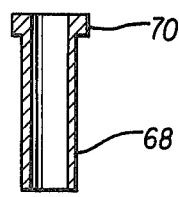
FIG. 11 is a cross-sectional view of an auxiliary drill guide used in conjunction with the drilling jig of FIG. 1.

In addition to its use as a drill guide, the instant invention may be used in conjunction with several adapters which will enable it to function as a divider, a compass, calipers, and saw or knife cutting guide. Various of these attachments are shown in FIGS. 11 through 19. FIG. 11 shows a drill guide having a generally hollow cylindrical body portion 68 and an enlarged head portion 70. Body portion 68 is dimensioned so as to slidably fit into drill guide bushing 24 until head portion 70 rests on top of the drill guide. This serves as a bushing to enable the use of smaller diameter drills with the four described drilling jig fixture.

Figure 12:
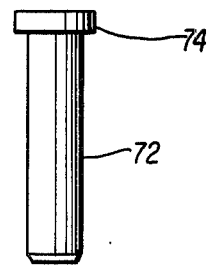
FIGS. 12 and 13 are side views of centering pins which are insertable into the drill-guide bushings according to the invention.
Figure 13:
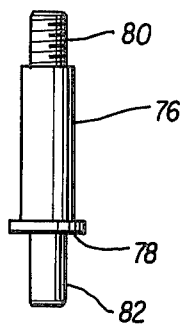

FIGS. 12 and 13 show centering pins having body portions 72 and 76, respectively, which slidably fit into drill guide bushing 24. Body portion 72 has enlarged head portion 74 which rests on top of the drill guide bushing. Body portion 76 has enlarged portion 78 at its lower extremity such that it extends upwardly through drill guide 24 with the threaded portion 80 extending beyond the upper portion of the drilling jig to be engaged by a nut (not shown). Centering pin 82 extends downwardly from enlarged portion 78, as shown.

The centering pins may be inserted into one of the drill guide bushings and into a hole in a flat, planar workpiece to enable a circular pattern of holes to be drilled.

Figure 17:
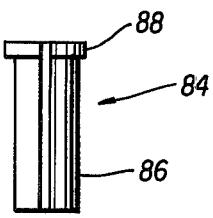
FIGS. 17 and 18 are side and bottom views of a saber saw guide adapter which is insertable into the drill guide bushings of the drilling jig of FIG. 1.
Figure 18:
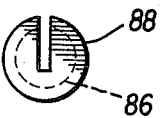
Figure 19:
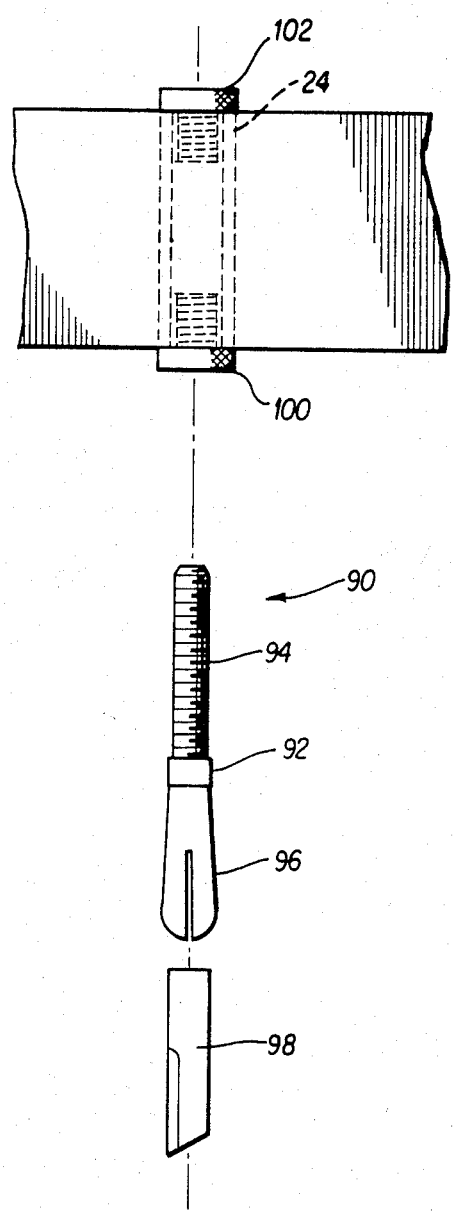
FIG. 19 is an exploded side view of a knife blade cutting adapter that is insertable into the drill guide bushings of the drilling jig shown in FIG. 1.

The instant invention is also capable of functioning as a saw or cutter guide to cut circular or arcuate workpieces by using the saw blade guide, shown in FIGS. 17 and 18 or the knife blade holder, shown in FIG. 19, in conjunction with either of the aforementioned centering pins. Saw blade guide 84 comprises cylindrical body portion 86 with enlarged head portion 88 located on one end and having a larger diameter than the body portion. Each of these elements is notched on one side so as to define a slot extending longitudinally therethrough. The guide may be placed in one of the drill guide bushings 24 and a saw blade (such as a saber saw) may extend downwardly through the slot and into the workpiece. Thus, when saw blade guide 84 is used in conjunction with a centering pin, the drilling jig can be used to cut arcuate or circular workpieces.

If the workpiece is such that it may be cut by a knife blade, blade holder 90, shown in FIG. 19, may be inserted into the drill guide bushing 24 instead of saw blade guide 84. Blade holder 90 comprises holder 92 having threaded portion 94 and blade holding portion 96. Blade holding portion 96 has a plurality of slots extending laterally and longitudinally thereacross such that blade 98 may be inserted into one of the slots. The outer periphery of blade holder 96 is conically shaped with the larger diameter portion facing downwardly. The threaded portion 94 of blade holder 92 is inserted upwardly through bushing 100, into drill guide bushing 24 and threadingly engaged with nut 102. As nut 102 is tightened, it draws the blade holder upwardly such that the conical outer surface on blade holder 96 engages the inner periphery of bushing 100. This causes the portions of blade holder 96 to deflect inwardly, thereby gripping blade 98.

Figure 14:
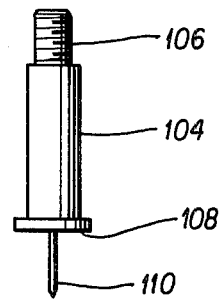
FIG. 14 is a side view of a divider point which is insertable into the drill bushings of the drilling jig of FIG. 1.
Figure 15:
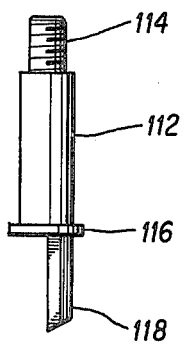
FIGS. 15 and 16 are side and bottom views of a caliper pin adapted insertable into the drill guide bushings of the drilling jig of FIG. 1.
Figure 16:
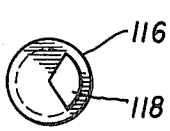

The aforementioned elements may also be used to cut or mark a straight line by drawing the drilling jig along the workpiece surface with one of the centering pins traversing along an edge of the workpiece. The drilling jig according to the invention may also be converted into a measuring instrument by using a pair of divider points, one of which is shown in FIG. 14, or the caliper pins, as shown in FIGS. 15 and 16. The divider point, again, comprises a body portion 104 that extends upwardly through drill guide bushing 24 and threaded portion 106 which extends beyond the upper surface of the drilling surface to be engaged by a nut (not shown). Enlarged portion 108 at the lower end of body portion 104 bears against the lower portion of drill guide bushing 24 to limit the upward movement of the divider point. Divider point 110 extends downwardly from enlarged portion 108. It is envisioned that one of these divider points would be located in one of the adjustable drill guide bushings 58 of element 16 while another point would be located in one of the fixed drill guide bushings 24. By moving the adjustable drill guide bushing 58, the device may function as a beam compass or divider to measure, or transfer large dimensions. Obviously, the divider point may be substituted for the centering pin, described previously, and used in conjunction with the saw blade guide or the knife blade holder to cut circular or arcuate workpieces where there is no existing centering hole.

In order to measure diametrical dimensions, the caliper pins shown in FIGS. 15 and 16 may be used. This pin comprises body portion 112 which extends upwardly through drill guide bushing 24 such that threaded portion 114 may be engaged by a nut (not shown) to retain it in place. Enlarged portion 116 limits the upward movement of the caliper pin and has caliper pin 118 extending therefrom. As shown in FIG. 16, caliper pin 118 is segmental in shape to ehable its use as either an inside, or outside caliper.

The foregoing description is solely for the purposes of explanation and should not be construed as limiting the scope of this invention, which is solely defined by the appended claims.

What is claimed is:

1. A multi-purpose drilling jig for accurately locating holes on a flat surface or along an edge of a workpiece comprising:
   a. a plurality of drill guide elements, each having a plurality of drill guide bushings;
   b. means for removably attaching the guide elements together end-to-end to form a rigid, elongated jig;
   c. at least one pair of lateral guide plates, said lateral guide plates adjustably attached to opposite sides of each drill guide element such that each lateral guide plate is adjustably movable in a generally vertical direction parallel to the sides of the guide elements, each lateral guide plate having a first surface of planar configuration and an opposite surface of stepped configuration so that workpieces of different widths may be accomodated between said first and opposite surfaces of said lateral guide plates; and, d. an end guide plate adjustably attached to an end of one of the guide elements such that it is adjustably movable in a generally vertical direction parallel to the end of the guide element.

2. The multi-purpose jig of claim 1 further comprising an additional drill guide element having a plurality of adjustable guide bushing attached thereto and means to removably attach said additional drill guide element to one of said guide elements end-to-end to form a rigid, elongated jig.

3. The multi-purpose drilling jig of claim 2 wherein the means for removably attaching the guide elements together comprises:

a. a pair of locating pins extending from one end of a first element generally parallel to the longitudinal axis of said element, one of said pins having a notch in one side;

b. means defining a pair of openings in an end of an adjacent element, the axes of said openings aligned with the axes of the locating pins, the openings being dimensioned to slidably receive the locating pins; and, c. locking pin means attached to said adjacent element to engage the notch in said locating pin when the pin is inserted into the hole, thereby attaching the elements together.

4. The multi-purpose drilling jig of claim 2 wherein the additional drill guide element comprises: a body portion defining a generally oval-shaped opening extending vertically therethrough, the body portion further defining a longitudinally extending ridge on either side of the opening; a plurality of drill guide bushings slidably mounted on the ridges within the opening; and, means to fasten the drill guide bushings in a desired location within the opening.

5. The multi-purpose drilling jig of claim 4 wherein the drill guide bushing defines first and second vertically oriented openings passing therethrough and wherein the fastening means comprises a threaded screw passing through the first opening, and a nut disposed at the lower extremity of the drill guide bushing and threadingly engaging the threaded screw, the lateral width of the nut being greater than the lateral width of the lower extremity of the drill guide bushing.

6. The multi-purpose drilling jig of claim 1 further comprising centering pin means slidably inserted in one of said guide bushing and extending below said jig so as to engage a workpiece below said jig.

7. The multi-purpose drilling jig of claim 2 further comprising centering pin means slidably inserted in one of said guide bushing and extending below said jig so as to engage a workpiece below said jig.

8. The multi-purpose drilling jig of claim 3 further comprising centering pin means slidably inserted in one of said guide bushing and extending below said jig so as to engage a workpiece below said jig.

9. The multi-purpose drilling jig of claim 1 further comprising a saw blade guide pivotably attached to a guide element through a guide bushing whereby a saw blade may be inserted through said blade guide and into a workpiece below said jig.

10. The multi-purpose drilling jig of claim 2 further comprising a saw blade guide pivotably attached to a guide element through a guide bushing whereby a saw blade may be inserted through said blade guide and into a workpiece below said jig.

11. The multi-purpose drilling jig of claim 3 further comprising a saw blade guide pivotably attached to a guide element through a guide bushing whereby a saw blade may be inserted through said blade guide and into a workpiece below said jig.

12. The multi-purpose drilling jig of claim 6 further comprising a knife blade and means to attach said knife blade to a guide bushing.

13. The multi-purpose drilling jig of claim 7 further comprising a knife blade and means to attach said knife blade to a guide bushing.

14. The multi-purpose drilling jig of claim 8 further comprising a knife blade and means to attach said knife blade to a guide bushing.

15. The multi-purpose drilling jig of claim 2 further comprising a pair of divider points, and means to attach said divider points to a pair of guide bushings.

16. The multi-purpose drilling jig of claim 3 further comprising a pair of divider points, and means to attach said divider points to a pair of guide bushings.

17. The multi-purpose drilling jig of claim 2 further comprising a pair of caliper pins, and means to attach said caliper pins to a pair of guide bushings so as to enable the jig to measure the inside or outside diameter of a workpiece.

* * * * *